(12) United States Patent
Kim et al.

(10) Patent No.: US 8,898,702 B2
(45) Date of Patent: Nov. 25, 2014

(54) VIDEO PROCESSING APPARATUS AND VIDEO PROCESSING METHOD THEREOF

(75) Inventors: Chi-won Kim, Suwon-si (KR); In-keun Kim, Suwon-si (KR); Tae-woo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1099 days.

(21) Appl. No.: 12/116,351

(22) Filed: May 7, 2008

(65) Prior Publication Data

US 2009/0046204 A1 Feb. 19, 2009

(30) Foreign Application Priority Data

Aug. 17, 2007 (KR) ........................ 10-2007-0082974

(51) Int. Cl.
*G06F 3/00* (2006.01)
*G06F 13/00* (2006.01)
*H04N 5/445* (2011.01)
*H04N 21/485* (2011.01)
*H04N 21/422* (2011.01)
*H04N 21/6543* (2011.01)
*H04N 7/16* (2011.01)
*H04N 21/488* (2011.01)
*H04N 21/443* (2011.01)

(52) U.S. Cl.
CPC ........... *H04N 7/163* (2013.01); *H04N 21/4854* (2013.01); *H04N 21/42204* (2013.01); *H04N 5/44513* (2013.01); *H04N 21/485* (2013.01); *H04N 21/6543* (2013.01); *H04N 21/4882* (2013.01); *H04N 21/443* (2013.01)
USPC ............. 725/47; 725/106; 725/114; 725/135; 725/136; 725/141; 725/153; 345/594

(58) Field of Classification Search
CPC .......... H04N 21/42204; H04N 21/443; H04N 21/485; H04N 21/4854; H04N 21/4882; H04N 21/6543
See application file for complete search history.

(56) References Cited

U.S. PATENT DOCUMENTS 6,263,502 B1 * 7/2001 Morrison et al. ................ 725/47
6,425,129 B1 * 7/2002 Sciammarella et al. ........ 725/38
6,802,011 B1 * 10/2004 Ogino ............................. 726/32
7,380,206 B1    5/2008 Usuda (Continued)

FOREIGN PATENT DOCUMENTS

JP      2001086078 A    3/2001
KR    20000075593 A   12/2000

(Continued)

OTHER PUBLICATIONS

Nack et al. "Everything You Wanted to Know About MPEG-7: Part 1" IEEE Multimedia, IEEE Service Center, New York, NY, US. vol. 6, No. 3. Jul. 1, 1999. XP000859976.

(Continued)

*Primary Examiner* — Joshua Taylor
(74) *Attorney, Agent, or Firm* — Sughrue Mion, PLLC

(57) ABSTRACT

A video processing apparatus includes: a communication unit which receives a video content and property information of the video content from an external supply source; a video processor which processes the video content; and a controller which controls the video processor to adjust a property of the video content based on the property information of the video content received through the communication unit.

23 Claims, 6 Drawing Sheets

(56) References Cited

U.S. PATENT DOCUMENTS

| | | |
|---|---|---|
| 2003/0078687 A1 | 4/2003 | Du Breuil |
| 2003/0227569 A1 | 12/2003 | Kim |
| 2005/0097618 A1* | 5/2005 | Arling et al. .................. 725/114 |
| 2005/0262542 A1* | 11/2005 | DeWeese et al. .............. 725/106 |
| 2006/0005221 A1* | 1/2006 | MacBeth et al. ................. 725/47 |
| 2006/0007358 A1 | 1/2006 | Kim |
| 2006/0238493 A1* | 10/2006 | Dunton .......................... 345/156 |
| 2007/0022464 A1* | 1/2007 | Dean .............................. 725/136 |
| 2007/0081097 A1 | 4/2007 | Ochi |
| 2007/0146545 A1 | 6/2007 | Iwahashi |
| 2008/0005696 A1* | 1/2008 | Shivaji-Rao .................. 715/822 |

FOREIGN PATENT DOCUMENTS

| | | |
|---|---|---|
| WO | 98/42127 A1 | 9/1998 |
| WO | 03/036949 A1 | 5/2003 |
| WO | 2008/070061 A2 | 6/2008 |
| WO | 2008/099303 A1 | 8/2008 |

OTHER PUBLICATIONS

Communication dated Sep. 10, 2013 issued by the Korean Intellectual Property Office in counterpart Korean Patent Application No. 1020070082974.

* cited by examiner

VIDEO PROCESSING APPARATUS AND VIDEO PROCESSING METHOD THEREOF

CROSS-REFERENCE TO RELATED APPLICATION

This application claims priority from Korean Patent Application No. 10-2007-0082974, filed on Aug. 17, 2007, in the Korean Intellectual Property Office, the disclosure of which is incorporated herein by reference.

BACKGROUND OF THE INVENTION

1. Field of the Invention

Apparatuses and methods consistent with the present invention relate to a video processing apparatus and a video processing method thereof, and more particularly, to a video processing apparatus which adjusts properties of a video, and a video processing method thereof.

2. Description of the Related Art

A video processing apparatus processes a video based on an inputted video signal. The inputted video signal includes an external video signal from a DVD (digital versatile disc) or the like, as well as a broadcasting signal.

With the widespread high-speed internet network, a broadcasting service is provided by using an IP (internet protocol). IPTV (Internet protocol television) system is able to provide video service such as movies and news according to user's demands, which is similar to VOD (video on demand) service.

More specifically, the VOD service is provided by using two-way communication, in which a compressed video content is stored in a video server to be supplied to a user through a high-speed communication network according to selection, play and demand of a user.

However, like in a conventional video processing apparatus which does not support the two-way communication, a user should adjust properties of video content in a conventional IPTV system. Since the types of adjustable properties have been various together with the various video contents, a user may not easily set the properties of the video contents to have an optimal video from the video processing apparatus.

SUMMARY OF THE INVENTION

Accordingly, it is an aspect of the present invention to provide a video processing apparatus which sets recommended properties of a video content to display an optimal video without difficulty, and a video processing method thereof.

Also, it is another aspect of the present invention to provide a video processing apparatus which provides a preview function of a video content having adjusted properties and improves user's convenience, and a video processing method thereof.

Further, it is another aspect of the present invention to provide a video processing apparatus which displays a video content having original properties according to a user's selection even after the properties of the video content are adjusted, and a video processing method thereof.

Additional aspects of the present invention will be set forth in part in the description which follows and, in part, will be obvious from the description, or may be learned by practice of the present invention.

The foregoing and/or other aspects of the present invention are also achieved by providing a video processing apparatus, including: a communication unit which receives a video content and property information of the video content from an external supply source; a video processor which processes the video content; and a controller which controls the video processor to adjust a property of the video content based on the property information of the video content received through the communication unit.

The received property information may be determined by at least one of identification information of the video processing apparatus and identification information of the video content.

The video processing apparatus may further comprise a user input unit which has a button to adjust the property of the video content, wherein the controller controls the video processor to adjust the property of the video content based on the received property information if a user inputs a command to adjust the property.

The video processing apparatus may further comprise a display unit and a UI (user interface) generator, wherein the controller controls the UI generator to generate and display a UI on the display unit and receives an input from a user whether to adjust the property if the property information is received.

The controller may control the UI generator to generate and display a UI on the display unit to display inadjustability of the property if the property information is not received.

The controller may control the video processor to display the video content having the adjusted property for preset time.

The controller may control the video processor to display at least one of a plurality of still images of the video content having the adjusted property.

The controller may control the video processor to restore the video content having the adjusted property to a video content having an original property according to a user's input.

The controller may control the video processor to restore the video content having the adjusted properties to a video content having an original property according to a user's input.

The property information may comprise at least one of color, brightness, saturation, color temperature and resolution.

The foregoing and/or other aspects of the present invention are also achieved by providing a video processing method of a video processing apparatus, the video processing method including: receiving a video content and property information of the video content from an external supply source; and adjusting a property of the video content based on the received property information.

The received property information may be determined by at least one of identification information of the video processing apparatus and identification information of the video content.

The adjusting the property of the video content may comprise adjusting the property of the video content if a user inputs a command to adjust the property.

The receiving the video content and property information of the video content may further comprise generating and displaying a UI to receive an input from a user whether to adjust the property if the property information is received.

The receiving the video content and property information of the video content may further comprise generating and displaying a UI to display inadjustability of the property if the property information is not received.

The adjusting the property of the video content may further comprise displaying the video content having the adjusted property for preset time.

The adjusting the property of the video content may further comprise displaying at least one of a plurality of still images of the video content having the adjusted property for preset time.

The adjusting the property of the video content may further comprise restoring the video content having the adjusted property to a video content having an original property.

The adjusting the properties of the video content may further comprise restoring the video content having the adjusted property to a video content having an original property.

The property information may comprise at least one of color, brightness, saturation, color temperature and resolution.

BRIEF DESCRIPTION OF THE DRAWINGS

The above and/or other aspects of the present invention will become apparent and more readily appreciated from the following description of the embodiments, taken in conjunction with the accompanying drawings of which.

DETAILED DESCRIPTION OF EXEMPLARY EMBODIMENT

Hereinafter, exemplary embodiments of the present invention will be described with reference to accompanying drawings, wherein like numerals refer to like elements and repetitive descriptions will be avoided as necessary.

Figure 1:
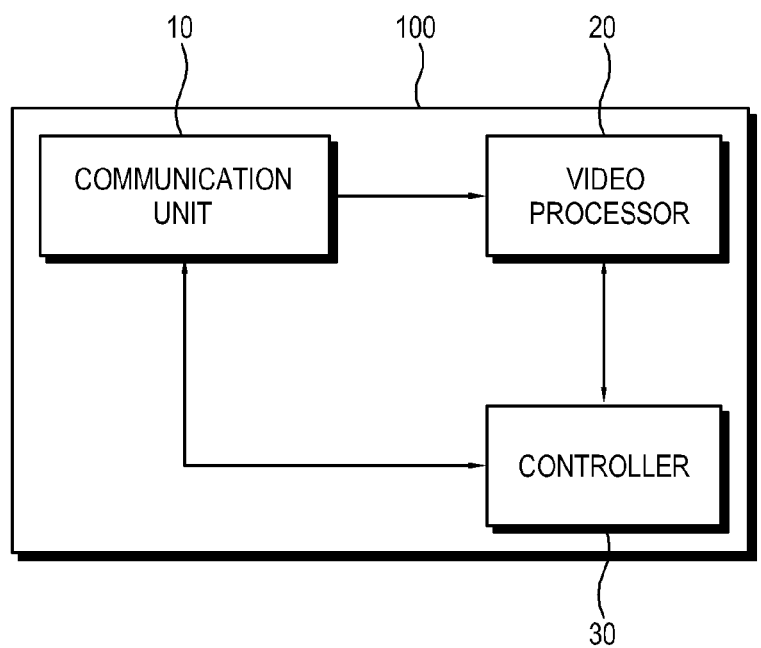
FIG. 1 is a block diagram of a video processing apparatus according to a first exemplary embodiment of the present invention.

FIG. 1 is a block diagram of a video processing apparatus according to a first exemplary embodiment of the present invention. As shown therein, a video processing apparatus 100 according to the present invention includes a communication unit 10, a video processor 20 and a controller 30. The video processing apparatus 100 according to the present invention may include a set-top box which supports an IPTV platform for two-way communication.

The communication unit 10 receives a video content and property information of the video content from an external supply source. Preferably, the communication unit 10 according to the present invention employs ADSL (Asymmetric digital subscriber line) transmission.

The external supply source stores the video content and the property information of the video content. The external supply source may include a video server of terrestrial wave broadcasting stations, regional broadcasting stations and cable broadcasting stations, etc. The external supply source may include a buffer to convert the video content into a continuous bit stream, a broadband transmission device, and a subscriber network accessing device.

The external supply source stores property information which is generated from at least one of identification information of the video processing apparatus 100 and identification information of the video content. More specifically, the external supply source may store the property information according to a combination of the identification information of the video processing apparatus 100 and of the video content. The property information may be stored in a lookup table format.

The identification information of the video processing apparatus 100 may include a model name of the video processing apparatus 100. If the video processing apparatus 100 includes a display unit 40 (to be described later), the identification information of the video processing apparatus 100 may include a type of the display unit 40 like a digital light processing (DLP), a liquid crystal display (LCD) and a plasma display panel (PDP).

If at least one of the identification information of the video processing apparatus 100 and the identification information of the video content is received, the external supply source transmits the property information according to the received identification information, to the video processing apparatus 100. Here, the property information may preferably be single, but also plural to be selectable by a user.

The property information which is stored in the external supply source is renewable by a user. A community type database may determine the property information of the video content.

Figure 2:
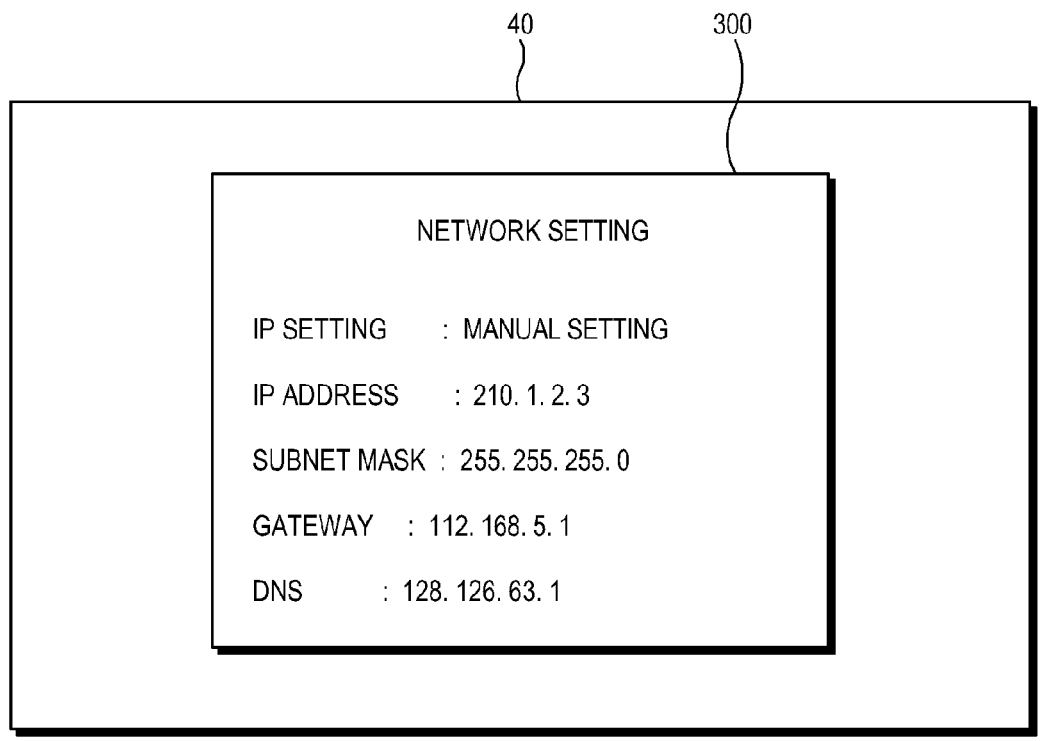
FIG. 2 illustrates a UI (user interface) to set a network of the video processing apparatus according to the present invention.

FIG. 2 illustrates a UI (user interface) 300 to set a network for communication between the communication unit 10 and the external supply source. As shown therein, the UI 300 may be used to set IP (internet protocol), IP address, a subnet mask, a gateway and DNS (domain name server).

The video processor 20 processes the video content received by the external supply source. More specifically, the video processor 20 may adjust at least one of color, brightness, saturation, color temperature and resolution of the video content. The video processor 20 according to the present invention may include various functions corresponding to formats of the inputted video signal. For example, the video processor 20 may have an A/D conversion function to convert various types of inputted video signals into a digital video signal, a digital decoding function, a scaling function and format conversion function to adjust vertical frequency, resolution, picture ratio according to an output standard of the display unit 40.

The controller 30 controls the video processor 20 to adjust the properties of the video content received through the communication unit 10, based on the property information thereof. The controller 30 according to the present invention may include a microcomputer and software.

Hereinafter, an operation of the controller 30 will be described in detail, exemplifying a function used in XML (extensible markup language) or Java application. If entering a reception mode of recommended property information according to a user's input, the controller 30 executes EnterRecommendedPicture( ). Here, the external supply source executes ResponseRecommendedPicture( ).

If receiving an input from a user to adjust the properties, the controller 30 executes GetRecommendedPicture( ) and controls the communication unit 10 to receive the property information from the external supply source.

The controller 30 executes PreviewRecommendedPicture( ) and ConfirmRecommendedPicture( ) and controls the video processor 20 to display the video content having adjusted properties for a certain time, thereby performing a preview function. In an exemplary embodiment, the certain time is preset.

Since the video content is provided as moving images, the controller 30 displays the video content for the certain time to perform the preview function. Alternatively, the controller 30 may control the video processor 20 to display at least one of a plurality of still images of the video content and perform the preview function.

If a user inputs a command to select the video content having the adjusted properties, the controller 30 executes SelectRecommendedPicture( ) and controls the video processor 20 to adjust the properties of the video content. Here, the external supply source executes SetRecommendedPicture( ).

Thus, a user may easily set the properties of the video content to have an optimal video.

Figure 3:
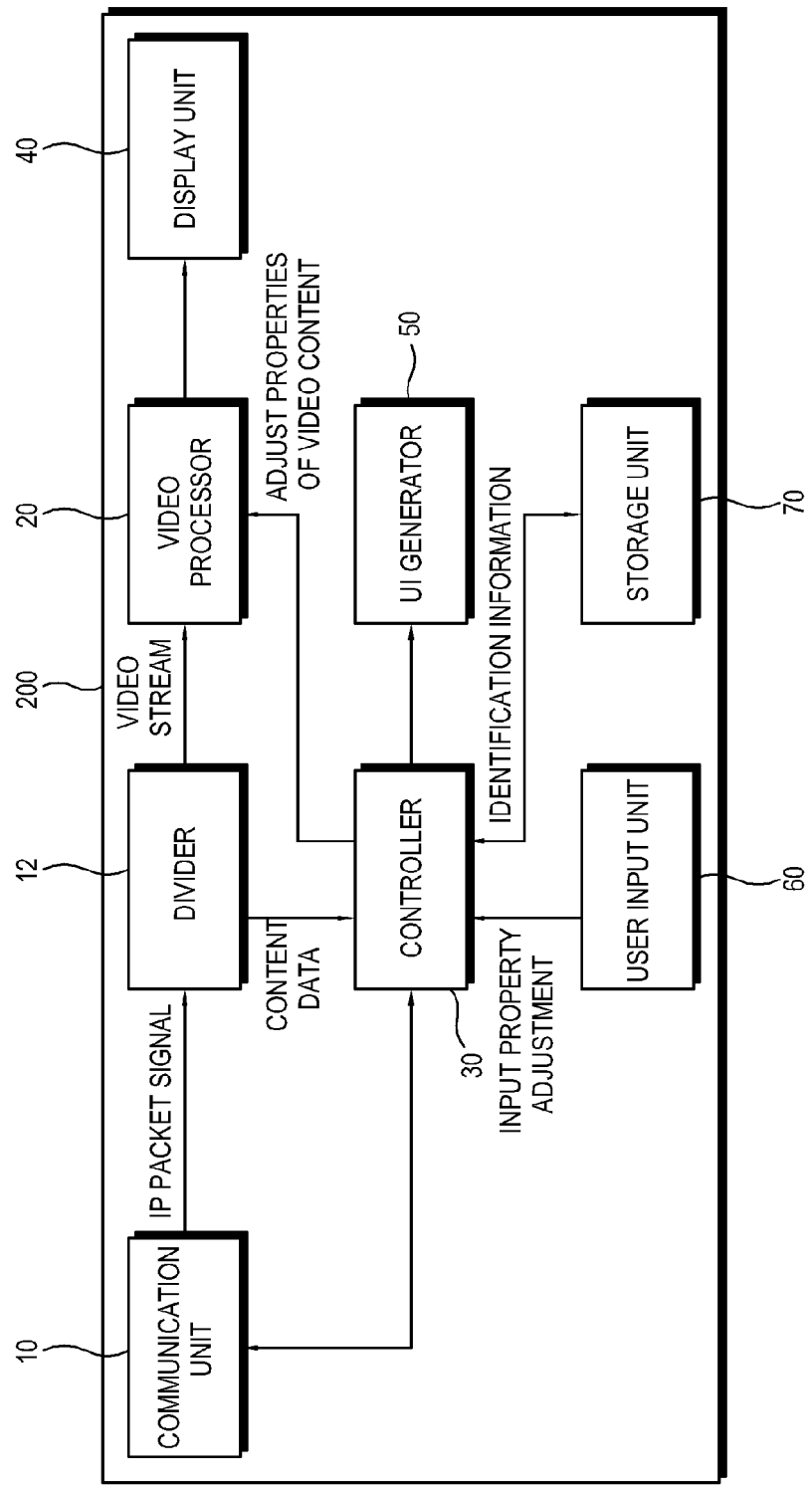
FIG. 3 is a block diagram of a video processing apparatus according to a second exemplary embodiment of the present invention.

Hereinafter, a video processing apparatus 200 according to a second exemplary embodiment of the present invention will be described with reference to FIG. 3. As shown therein, the video processing apparatus 200 according to the second exemplary embodiment of the present invention further includes a display unit 40, a UI generator 50, a user input unit 60 and a storage unit 70. The video processing apparatus 200 according to the second exemplary embodiment of the present invention may include a TV which supports an IPTV platform.

The display unit 40 displays a video corresponding to a video content received through a communication unit 10. The display unit 40 according to the present invention may vary including a digital light processing (DLP), a liquid crystal display (LCD) and a plasma display panel (PDP).

Alternatively, the video processing apparatus 200 according to the second exemplary embodiment of the present invention may include a set-top box without a display unit 40. In this case, the video processing apparatus 200 includes a connector (not shown) to be connected with an external display unit 40.

If property information is received, the UI generator 50 generates a UI to adjust properties of the video content according to a control of the controller 30. If the property information is not received, the UI generator 50 according to the present invention may generate a UI which displays inadjustability of the properties of the video content.

An IP packet signal which is received through the communication unit 10 is supplied to a divider 12 to be divided into a video stream and content data. The divided video stream is transmitted to the video processor 20 while the content data are transmitted to the controller 30. The controller 30 controls the video processor 20 to adjust the properties of the video content based on the received content data.

Figure 4:
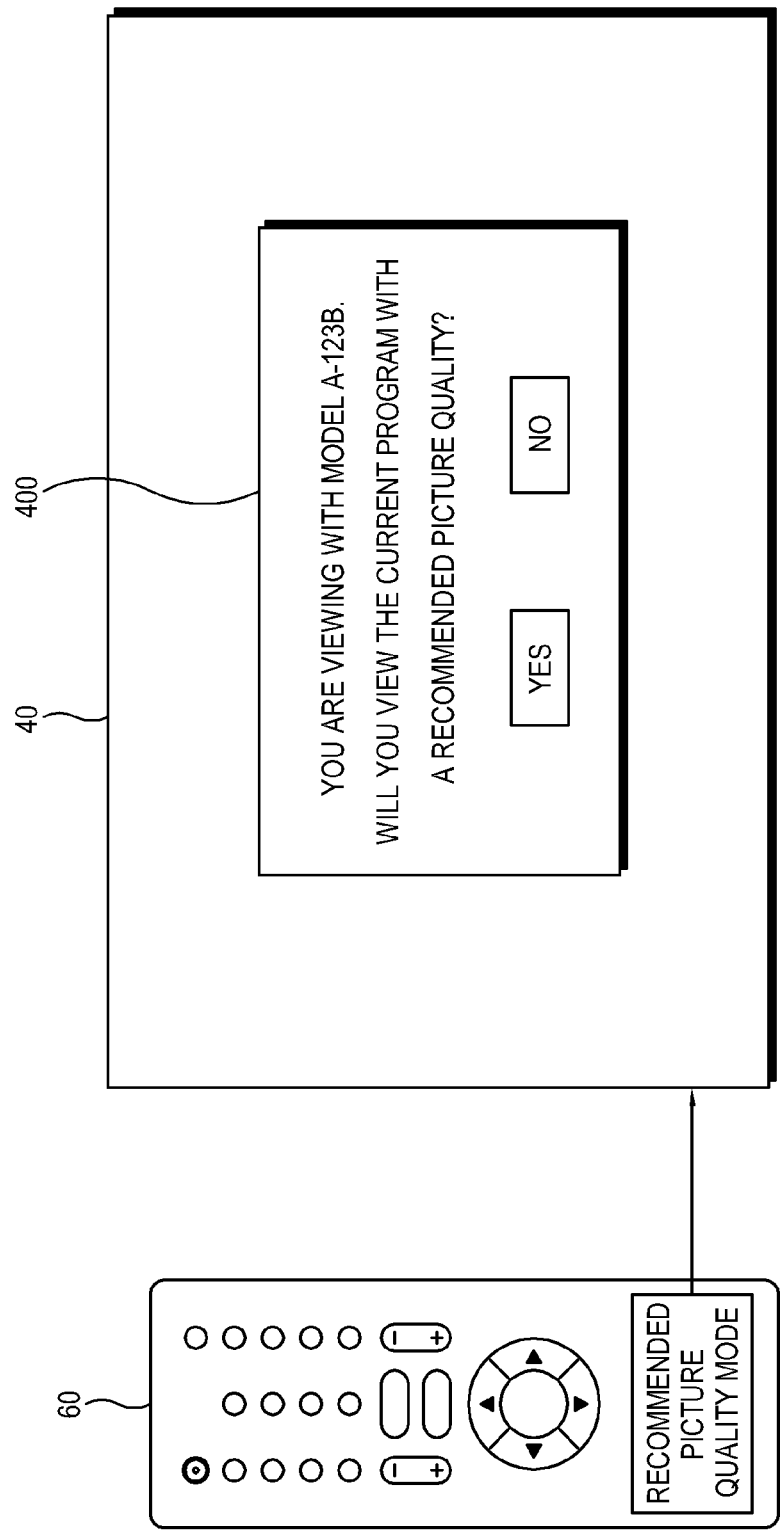
FIG. 4 illustrates a UI to adjust properties of a video content in the image processing apparatus according to the present invention.

FIG. 4 illustrates a UI to display a video content whose properties are adjusted based on the property information. As shown therein, if a user presses a "recommended picture quality mode" button of the user input unit 60 (to be described later) to adjust the properties, the controller 30 displays a UI 400 to receive an input from a user indicating whether the properties of the video content are to be adjusted, and controls the video processor 20 to adjust the properties of the video content if an input from a user to adjust the properties is received.

Figure 5:
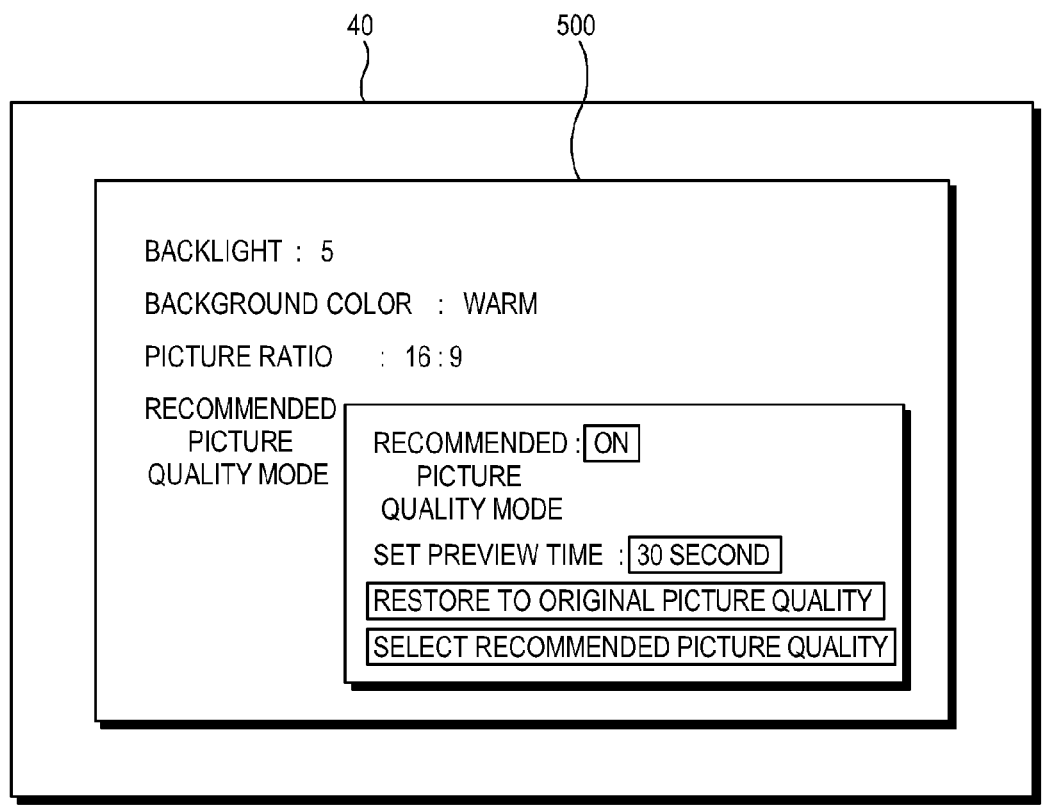
FIG. 5 illustrates a UI to set a reception mode of property information in the video processing apparatus according to the present invention.

FIG. 5 illustrates a UI 500 to enter a recommended property mode. As shown therein, the UI 500 is displayed to turn on or off the recommended picture quality mode, to set preview time, to select "restore to previous picture quality" to restore the video content having adjusted properties to its original video content, and to select "recommended picture quality" to display property information.

The user input unit 60 includes a button to adjust the properties of the video content, and receives an input from a user to adjust the properties thereof. The user input unit 60 may receive an input to perform the preview function displaying the video content having the adjusted properties for a certain time, or receive an input to restore the video content having the adjusted properties to its original state while the preview function is performed. In an exemplary embodiment the certain time is preset.

The user input unit 60 according to the present invention may include a hot key to select property adjustment of the video content. The user input unit 60 may further include a number key and a direction key to select a channel, and a function key to select a function of the video processing apparatus 200. The user input unit 60 according to the present invention may include a remote controller or may be provided in the video processing apparatus 200.

The storage unit 70 stores the video content therein. If the video content having the adjusted properties is displayed on the display unit 40, the storage unit 70 stores the video content having original properties, according to a control of the controller 30. If a user inputs a command to restore the properties of the video content, the video content which is stored in the original state in the storage unit 70 is displayed.

The storage unit 70 may store at least one of identification information of the video processing apparatus 100 and identification information of the video content.

Figure 6:
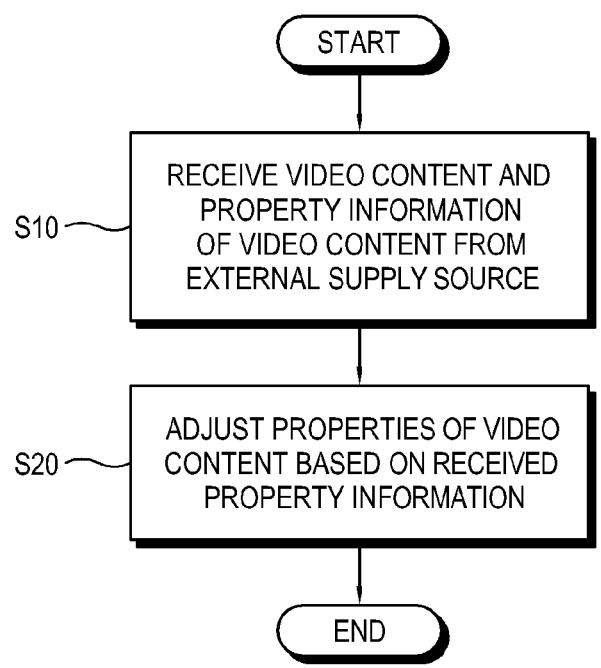
FIG. 6 is a flowchart to describe a video processing method of the video processing apparatus according to the present invention.

Hereinafter, a video processing method of the video processing apparatuses 100 and 200 according to the present invention will be described with reference to FIG. 6.

First, the controller 30 receives the video content and the property information of the video content from the external supply source (S10). The operation S10 may include an operation of generating and displaying a UI to receive an input from a user indicating whether the properties of the video content are to be adjusted, if the property information is received, and an operation of generating and displaying a UI displaying the unadjustability of the properties if the property information is not received.

The operation S10 may further include an operation of transmitting the identification information of the video processing apparatuses 100 and 200 and of the video content to the external supply source to receive the property information, which may be performed prior to the operation S10.

The controller 30 adjusts the properties of the video content based on the property information received at operation S10 (S20). The operation S20 may further include an operation of displaying the video content having the adjusted properties for a certain time, an operation of displaying at least one of the plurality of still images of the video content having the adjusted properties for a certain time, and an operation of restoring the video content having the adjusted properties to the original state. In an embodiment, the certain times are preset times.

As described above, the present invention provides a video processing apparatus which sets recommended properties of a video content to display an optimal video without difficulty, and a video processing method thereof.

Also, the present invention provides a video processing apparatus which has a preview function to preview a video content having adjusted properties and improves a user's convenience, and a video processing method thereof.

Further, the present invention provides a video processing apparatus which displays a video content having original properties according to a user's selection even after the properties of the video content are adjusted, and a video processing method thereof.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A video processing apparatus of a television or a set-top box, the apparatus comprising:
    a broadcasting signal receiving unit configured to receive a broadcasting signal comprising a video content;
    a communication unit configured to receive picture quality setting information for the video content from an external supply source;
    a video processor configured to process the video content;
    a controller configured to control the video processor to adjust a picture quality setting based on the picture quality setting information for the video content when a user input for confirming the adjustment is received; and
    a user interface (UI) generator configured to generate a UI for receiving the user input for confirming the adjustment,
    wherein the controller is configured to control the communication unit to transmit identification information of the video processing apparatus and identification information of the video content to the external supply source to receive the picture quality setting information.

2. The video processing apparatus according to claim 1, wherein the picture quality setting information is determined by at least one of identification information of the video processing apparatus and property information of the video content.

3. The video processing apparatus according to claim 1, further comprising a user input unit comprising a button to adjust the picture quality setting of the video content, wherein
    the controller controls the video processor to adjust the picture quality setting of the video content based on the picture quality setting information if a user inputs a command to adjust the picture quality setting of the video content.

4. The video processing apparatus according to claim 3, further comprising a display unit, wherein
    the controller controls the UI generator to generate and display the UI on the display unit and receive an input from the user indicating whether the picture quality setting of the video content is to be adjusted, if the picture quality setting information is received.

5. The video processing apparatus according to claim 4, wherein the controller controls the UI generator to generate and display the UI on the display unit to display an inadjustability of the picture quality setting of the video content if the picture quality setting information is not received.

6. The video processing apparatus according to claim 3, wherein the controller controls the video processor to display the video content having the adjusted picture quality setting of the video content, for a time.

7. The video processing apparatus according to claim 6, wherein the controller controls the video processor to display at least one of a plurality of still images of a video content having the adjusted picture quality setting of the video content.

8. The video processing apparatus according to claim 7, wherein the controller controls the video processor to restore the video content having the adjusted picture quality setting of the video content, to a video content having an original picture quality setting, according to a user's input.

9. The video processing apparatus according to claim 6, wherein the controller controls the video processor to restore the video content having the adjusted picture quality setting of the video content to a video content having an original picture quality setting according to a user's input.

10. The video processing apparatus according to claim 1, wherein the picture quality setting information comprises at least one of color, brightness, saturation, color temperature and resolution.

11. The video processing apparatus according to claim 1, wherein the controller controls the video processor to perform a preview function which displays the video content having the adjusted picture quality setting for a preset period of time.

12. The video processing apparatus according to claim 1, wherein the picture quality setting information stored in the external supply source is renewable by a user, and is determined by a community type database.

13. A video processing method of a video processing apparatus, the video processing method comprising:
    receiving a broadcasting signal comprising a video content;
    receiving, at the video processing apparatus, picture quality setting information for the video content transmitted from an external supply source; and
    adjusting, by a controller, a picture quality setting based on the picture quality setting information for the video content when a user input for confirming the adjustment is received; and
    generating a user interface (UI) for receiving the user input for confirming the adjustment,
    wherein the controller is configured to control the communication unit to transmit identification information of the video processing apparatus and identification of the video content to the external supply source to receive the picture quality setting information.

14. The video processing method according to claim 13, wherein the picture quality setting information is determined by at least one of identification information of the video processing apparatus and property information of the video content.

15. The video processing method according to claim 13, wherein the adjusting the picture quality setting of the video content comprises adjusting the picture quality setting of the video content if a user inputs a command to adjust the picture quality setting of the video content.

16. The video processing method according to claim 13, wherein the receiving picture quality setting information of the video content further comprises generating and displaying the user interface (UI) to receive an input from the user indicating whether the picture quality setting of the video content is to be adjusted, if the picture quality setting information is received.

17. The video processing method according to claim 16, wherein the receiving picture quality setting information of the video content further comprises generating and displaying the UI to display an inadjustability of the picture quality setting of the video content if the picture quality setting information is not received.

18. The video processing method according to claim 15, wherein the adjusting the picture quality setting of the video content further comprises displaying the video content having the adjusted picture quality setting for a time.

19. The video processing method according to claim 18, wherein the adjusting the picture quality setting of the video content further comprises displaying at least one of a plurality of still images of the video content having the adjusted picture quality setting of the video content.

20. The video processing method according to claim 19, wherein the adjusting the picture quality setting of the video content further comprises restoring the video content having the adjusted picture quality setting of the video content to a video content having an original picture quality setting.

21. The video processing method according to claim 18, wherein the adjusting the picture quality setting of the video content further comprises restoring the video content having the adjusted picture quality setting to a video content having an original picture quality setting of the video content.

22. The video processing method according to claim 13, wherein the picture quality setting information comprises at least one of color, brightness, saturation, color temperature and resolution.

23. The video processing method according to claim 13, further comprising performing a preview function which displays the video content having the adjusted picture quality setting for a preset period of time.

\* \* \* \* \*